Figure 1:
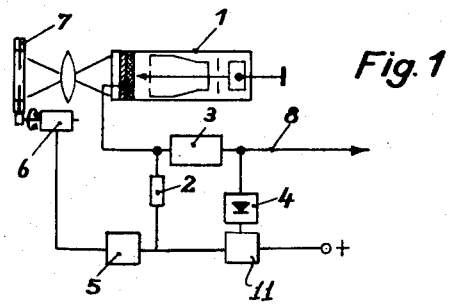

April 16, 1963 W. MAYER 3,086,077
TELEVISION CAMERA REGULATING SYSTEM
Filed July 17, 1956

INVENTOR
Walter Mayer
By Ralph B. Stewart
attorney

United States Patent Office 3,086,077
Patented Apr. 16, 1963

3,086,077
TELEVISION CAMERA REGULATING SYSTEM
Walter Mayer, Furth, Germany, assignor to
Max Grundig, Furth, Germany
Filed July 17, 1956, Ser. No. 598,328
Claims priority, application Germany July 23, 1955
3 Claims. (Cl. 178—7.2)

Film and television cameras have been known in which the diaphragm is automatically adjusted to different or to changing light conditions. Furthermore, television cameras are known in which the photo-current flowing in the tube is indicated by means of an electrical measuring instrument so that the cost of a separate light meter is eliminated. The usual devices for automatic adjustment of the diaphragm have the disadvantage that because of the small currents available in the light meter, in spite of the use of sensitive relays which connect in and out the motors that are necessary for adjusting the diaphragm, they require too great a deviation from the desired value so that inadmissibly high fluctuations of light exposure occur. This is true also in television cameras in which the photocurrent of the pickup tube serves as the controlling current. Moreover, the brightness range which is provided for by normal lens diaphragms is for practical purposes not sufficient, so that additional gray filters must be used.

It has been shown that in television pick-up tubes which are equipped with semiconductor photolayers having internal photoelectric effect, automatic adjustment to changes in light condition is possible by changing the signal plate voltage. It is therefore possible with a fixed adjustment of the diaphragm of the pickup objective and with variable lighting to get satisfactory pictures by suitable adjustment of the signal plate voltage.

This fact is made use of according to the invention and the defects of known devices are avoided by deriving a regulating voltage from the signal current, which regulating voltage controls the normal voltage of the signal plate in such a way that the mean signal current remains substantially constant independently of variations in scene brightness. The diaphragm of the optical system can be adjusted permanently in accordance with the desired depth of focus and will stay that way. By changing the signal plate voltage, fluctuations of brightness are compensated in the ratio 1:100. If in practice brightness fluctuations greater than 1:100 occur, it is possible by combination with an automatic diaphragm adjustment to extend the brightness range in accordance with the diaphragm ratio. The control of the diaphragm can conveniently be provided by the signal current that is present from time to time. The disadvantage which is characteristic of automatic diaphragm adjustment in known devices, namely that the steps are too coarse, is not of any importance in the device according to the invention, since the coarse steps are compensated by the simultaneous automatic regulation of the signal plate voltage. As ordinary objectives, by adjustment of the optical diaphragm, compensate a brightness ratio of about 1:70 and the adjustment of the signal plate voltage is effective for a ratio of 1:100, the simultaneous use of both expedients yields are attainable brightness range of 1:70×100.

For automatic adjustment of the signal plate voltage, it is necessary that the potential drop produced by the signal current in a resistance be amplified. Without this direct voltage amplification, the necessary adjustment of the plate voltage is not attainable. According to a further concept of the inventive idea, the cost of this direct voltage amplifier can be avoided if the video signal supplied by the camera pre-amplifier is made use of for regulation. This is obtained by suitable rectification of the video signal and the use of the direct voltage thus produced for regulating purposes.

In actual practice, especially in industrial television, the brightness range of the pictured object can under some circumstances be so large that it becomes impossible to work with it. This condition occurs, for example, in the supervision of roll-trains. In this case the correct reproduction of the brightness of the glowing rolling material is of minor importance. It is important, however, that the much darker surroundings be reproduced with the greatest possible richness of contrast. In this case, it is inexpedient to effect a rectifying of the peaks of the video signals which would give a correct adjustment of the signal plate voltage. Hence, middle-value rectification is to be recommended in this case under conditions according to clipping of the video signals heretofore. In order to avoid overload chopping of the television receiver device, it is possible under certain circumstances to introduce a clipping of the white at a later point in the process of video amplification. There results then a reproduction of the dark parts of the pictures which is rich in contrast, while the brightness-steps in the uninteresting bright parts of the picture disappear. The reverse problem is found in the supervision of the outflow of slag from a Kessel-furnace. Here it is necessary to show the steps of brightness in the brighter picture parts as conspicuously as possible in order to make possible the gauging of the slag temperature. In this case then the use of a peak rectification is suitable.

In order to be able to adjust the television pick-up camera to different tasks, the rectification can be varied in steps or in a continuous manner. In all cases the time constant of the control voltage must be chosen considerably greater, at least 10 times as great as the scanning duration of a picture. It is possible to effect regulation of the optical diaphragm and also of the signal plate voltage by the same regulating voltage. On the other hand, it is, however, also possible to control these two regulating processes by different regulating voltages. For example, the optical diaphragm control can be accomplished by the signal current, and the signal plate voltage can be influenced by the regulating voltage derived from the video amplifier. If one controls both regulating processes through the regulating voltage obtained from the peak rectification, then the effect obtained thereby, namely the highly contrasted reproduction of the bright picture parts at the expense of the dark, is especially marked. If on the other hand, the control of the optical diaphragm is effected by the signal current which necessarily has the character of a middle value formation, then the effect of the peak rectification is weakened. By proper choice of the regulating voltage, a solution of the most different problems thus becomes possible.

Figure 2:
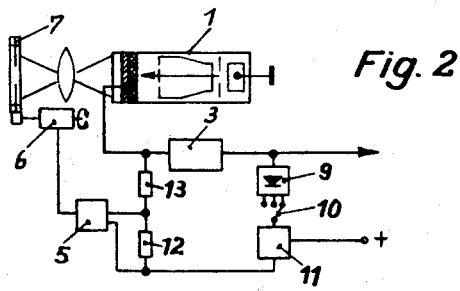
Figure 3:
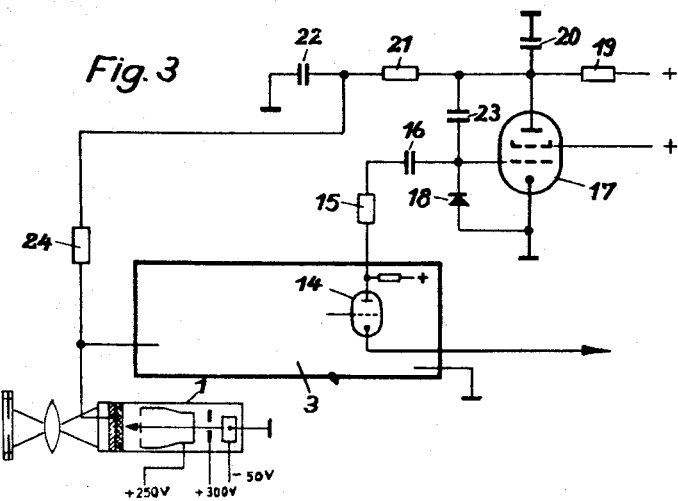

In FIGURES 1 to 3 embodiments of the invention are shown schematically. In FIG. 1, 1 represents the television pickup tube operating on the vidicon principle, the signal voltage of which is taken off across resistance 2. It is amplified in the camera amplifier 3. The amplified signal voltage which can be taken off at the amplifier output 8 is rectified by the rectifier 4 and the rectified voltage is supplied to the signal plate circuit of the television pickup tube 1 through amplifier 11 and also to a switching control device 5, which by means of the adjusting motor 6 adjusts the diaphragm 7 of the optical system to maintain a substantially constant mean (middle value) signal current.

In the modification shown in FIG. 2, a rectifier 9 is provided by which, by means of a switch 10, for example, the type of rectification can be adjusted, such as peak or middle-value rectification or also intermediate values between these rectifier conditions. It is possible in this way to effect adjustment of the whole system to the object being observed at the time, or to select which range of brightness is to be preferred for reproduction at the expense of others. The voltage derived from the rectifier 9 is applied, for example, by way of a regulating voltage amplifier 11 which leads by way of resistances 12 and 13 to the signal plate of the television pickup tube 1. The control voltage for the switching device 5 is tapped off at resistance 12 which can also serve as a filter resistance for the signal plate voltage while the signal voltage is taken off across resistance 13.

In FIG. 3 is shown a voltage arrangement by which the output voltage of the camera amplifier, the signal voltage, can be regulated in accordance with the mean brightness on the signal plate. The video voltage taken off at the anode of the last tube of the camera amplifier 3 is supplied to the grid of an amplifier tube 17 by way of a resistance 15 and a condenser 16, a rectifier 18 also being connected in parallel with the input of tube 17. The rectified and amplified video output signal appears in the anode circuit of the amplifier tube 17. After being smoothed out by means of the RC members 19, 20 and 21, 22 and also by the action of feedback condenser 23, the rectified voltage is applied to the signal plate by way of resistance 24. The circuit arrangement described can be conceived essentially as a voltage divider consisting of the resistance 19 and the amplifier tube 17, in which one resistance (amplifier tube 17) varies in accordance with the illumination on the signal plate, and thereby adjusts the signal plate voltage in accordance with the degree of illumination on the signal plate to maintain the signal current constant.

I claim:

1. In a television camera including a picture pick-up tube operating on the vidicon principle and developing a video signal current at the signal plate thereof and in which the amplitude of the signal current, for a predetermined brightness of an optical image thereon, is dependent upon the value of a direct-current biasing voltage applied to the signal plate, means for rectifying video signal current derived from said signal plate and producing rectified signal current, voltage regulating means controlled by said rectified signal current and varying the value of said biasing voltage applied to the signal plate to maintain the mean signal current substantially constant, an adjustable diaphragm shutter in the optical system of the pick-up tube, and means controlled by said rectified signal current for simultaneously adjusting said shutter to move the shutter in the opening direction as the picture signal decreases and to move the shutter in the closing direction as the picture signal increases.

2. In a television transmission system including a picture pick-up tube operating on the vidicon principle and developing a video signal current at the signal plate thereof and in which the amplitude of the signal current, for a predetermined brightness of an optical image thereon, is dependent upon the biasing voltage applied to the signal plate, a source of fixed direct-current biasing potential connected to the signal plate through an impedance, means coupled to the signal plate for deriving from across said impedance a video signal voltage which varies in amplitude in accordance with variations in brightness of the successively scanned image areas, a rectifying circuit, means for applying said video signal voltage to the rectifying circuit to derive therefrom a direct current output voltage of a value proportional to the mean brightness of the image on said plate, means responsive to said direct current voltage for varying the value of the bias voltage applied to the plate, an adjustable diaphragm shutter in the optical system of the pick-up tube, and shutter control means controlled by said rectified voltage for simultaneously adjusting the diaphragm shutter to move the shutter in the opening direction as the picture signal decreases and to move the shutter in the closing direction as the picture signal increases.

3. A television transmission system according to claim 2 wherein said shutter control means comprises a motor for opening and closing the shutter, and control means responsive to said rectified voltage and controlling the operation of said motor to operate said motor in the shutter-opening direction as the picture signal decreases and to operate said motor in the shutter-closing direction as the picture signal increases.

References Cited in the file of this patent

UNITED STATES PATENTS

| | | |
|---|---|---|
| 2,250,293 | Bunger | July 22, 1941 |
| 2,417,506 | Lamb | Mar. 18, 1947 |
| 2,451,640 | Thalner | Oct. 19, 1948 |
| 2,465,667 | Thalner | Mar. 29, 1949 |
| 2,786,960 | Palmer | Mar. 26, 1957 |
| 2,978,537 | Kruse | Apr. 4, 1961 |

FOREIGN PATENTS

| | | |
|---|---|---|
| 444,074 | Great Britain | Mar. 12, 1936 |